(12) United States Patent
Nadeau et al.

(10) Patent No.: US 7,599,303 B2
(45) Date of Patent: Oct. 6, 2009

(54) SYSTEM AND METHODS FOR SENDING TRACE MESSAGES

(75) Inventors: Thomas D. Nadeau, Hampton, NH (US); W. Mark Townsley, Nashville, TN (US)

(73) Assignee: Cisco Technology, Inc., San Jose, CA (US)

( * ) Notice: Subject to any disclaimer, the term of this patent is extended or adjusted under 35 U.S.C. 154(b) by 581 days.

(21) Appl. No.: 11/189,357

(22) Filed: Jul. 26, 2005

(65) Prior Publication Data

US 2007/0025241 A1    Feb. 1, 2007

(51) Int. Cl.
*G06F 11/00* (2006.01)
*H04L 12/26* (2006.01)
*H04J 1/16* (2006.01)

(52) U.S. Cl. .................. 370/248; 370/252; 370/236
(58) Field of Classification Search .............. 370/229, 370/236, 236.1, 236.2, 241.1, 241, 252, 248
See application file for complete search history.

(56) References Cited

U.S. PATENT DOCUMENTS

| | | | | |
|---|---|---|---|---|
| 6,538,997 B1 * | 3/2003 | Wang et al. | ............... | 370/241 |
| 6,608,833 B2 * | 8/2003 | Katsube et al. | ............ | 370/392 |
| 6,760,309 B1 * | 7/2004 | Rochberger et al. | ........ | 370/235 |
| 6,958,977 B1 * | 10/2005 | Mitrani et al. | ............. | 370/252 |
| 7,304,954 B1 * | 12/2007 | Gupta et al. | ............ | 370/236.1 |
| 7,443,801 B2 * | 10/2008 | Neidhardt et al. | ........... | 370/238 |
| 7,450,582 B2 * | 11/2008 | Suh et al. | ..................... | 370/392 |
| 7,519,006 B1 * | 4/2009 | Wing | ......................... | 370/252 |
| 2004/0081101 A1 * | 4/2004 | Bennett | ...................... | 370/252 |
| 2004/0141527 A1 * | 7/2004 | Bennett et al. | ............... | 370/503 |
| 2005/0015647 A1 * | 1/2005 | Okada et al. | ................... | 714/5 |
| 2005/0018647 A1 * | 1/2005 | Lebrun et al. | ............... | 370/351 |
| 2005/0099948 A1 * | 5/2005 | Wakumoto et al. | ......... | 370/236 |
| 2005/0135257 A1 * | 6/2005 | Stephens et al. | ............ | 370/241 |
| 2005/0265356 A1 * | 12/2005 | Kawarai et al. | ........ | 370/395.53 |
| 2006/0072479 A1 * | 4/2006 | Loyd | .......................... | 370/254 |
| 2007/0115840 A1 * | 5/2007 | Feick et al. | ................. | 370/252 |

* cited by examiner

*Primary Examiner*—Chi H Pham
*Assistant Examiner*—Warner Wong
(74) *Attorney, Agent, or Firm*—Brinks Hofer Gilson & Lione

(57) ABSTRACT

A traceroute mechanism enables responses to the traceroute to reach the originating router (originator) along a multihop pseudowire (PW). A traceroute message includes an accumulator operable to count hops along a MH-PW, implemented as a time-to-live (TTL) field, as is known in the art. An originator router employs multiple TTL values, and decrements one of the TTL "accumulators" for each hop. At the ultimate (terminal) router defining the end of the multihop PW, a TTL in the return message is set to the number of hops traveled by the traceroute. The difference between the accumulator and the initial TTL value determines the number of hops traveled by the traceroute message, and hence the number of hops back to the originating node. The traceroute return message, now having a TTL set to the number of hops of the counterpart traceroute, reaches the originator when the TTL value is decremented to zero.

16 Claims, 6 Drawing Sheets

SYSTEM AND METHODS FOR SENDING TRACE MESSAGES

BACKGROUND

Virtual Private Networks (VPNs) have gained increasing popularity by allowing institutional entities, such as corporations and universities, to maintain geographically distinct sites, or sets of users, as part of a homogeneous network. Accordingly, computer networks employed in such an arrangement include various configurations of the Internet, Service Provider (SP) networks, private networks, and Local Area Networks (LANs). A network such as an SP network may include peripherally located Provider Edge (PE) routers, each of which couples to one or multiple Customer Edge (CE) routers. The PE routers are used to maintain routing and forwarding context for each customer. The CE routers may couple to private LANs, or VPN subnetworks, associated with one or more customers. The PE routers learn local customer routes from the CE routers and distribute remote customer routes to the CE router. The PEs typically use the Border Gateway Protocol (BGP) to distribute customer routes to each other. To support routing operations, the PE routers maintain Virtual Routing and Forwarding (VRF) information in a table (a VRF table) dictating how to route and forward traffic through the shared physical network, also known as a core network, to support corresponding Virtual Private Networks (VPNs) for the different customers. Typically, the SP network selectively couples the LANs to each other through links created between its PE routers. For the core network, an ingress PE uses BGP functions to determine the egress PE. The ingress PE puts the packet in a two-level Multi Protocol Label Switching (MPLS) stack. The top label is used to tunnel packets to the egress PE to accomplish MPLS forwarding through the core network. The bottom label is used by the egress PE to identify the outgoing route for the packet.

VPNs, therefore, provide a secured means for transmitting and receiving data between network nodes even though a corresponding physical network supporting propagation of the data is shared by many users (and VPNs). In a typical networking environment used for routing data, the environment may include a number of Customer Edge (CE) routers, a number of Provider Edge (PE) routers and a packet-switched network (PSN). The PSN encompasses one or more core networks, each having a set of PE routers, interconnecting CE routers serving particular customer subnetworks. In a conventional exchange, data, encapsulated in layer-2 frames, may be forwarded from a first CE router to a first PE router, from the first PE router across the PSN to a second PE router, and from the second PE router to a second CE router.

In a large system having multiple service providers, each service provider may provide a portion, or core network, of the PSN. Particular providers may, for example, provide a portion of the overall (end-to-end) network, which may be one (or all) of the access network, core network (i.e. 1 or more autonomous systems), or an intermediate network between the end points (i.e.: a transit network). Therefore, a conventional VPN transmission may traverse many core networks, each operating as an autonomous system (AS) and having a set of ingress and egress PE routers. Accordingly, switching operations tend to become numerous and complex. A Pseudowire (PW) may be utilized to transfer data across the PSN. A Pseudowire is a mechanism that emulates attributes of a native service such as Asynchronous Transfer Mode (ATM), Frame Relay (FR), Point-to-Point Protocol (PPP), High Level Data Link Control (HDLC), Synchronous Optical Network (SONET) Frames or IEEE Ethernet over a PSN. The functions provided by the PW include encapsulating Protocol Data Units (PDUs) arriving at an ingress port, carrying them across a path or tunnel, managing their timing and order, and any other operations required to emulate the behavior and characteristics of the particular service. In a particular embodiment, PWs are used to carry ingress layer-2 traffic from an ingress PE router to an egress PE router, and then forward the layer-2 traffic out of an egress port of the egress PE router.

In conventional, or single hop pseudowire arrangements, a PDU (e.g., a frame) traverses the networking environment beginning at a first CE router and ending up at a second CE router. The first CE router sends a layer-2 PDU to an ingress PE router. The ingress PE router receives the PDU and encapsulates the PDU with MPLS labels which are used to identify the individual port/circuit and the egress layer-3 PE router. The encapsulated PDU is then forwarded on the PW, across the packet-switched network, to an egress layer-3 PE router. The egress layer-3 PE router removes the MPLS label that identifies the port/circuit that was added by the ingress PE router and forwards the layer 2 PDU to the second CE router. Therefore, the pseudowire transmission travels from a CE router to an ingress PE router denoting an endpoint of the single hop pseudowire. The ingress PE sends the packet, via the pseudowire, to an egress PE at a remote end of the pseudowire, across the core. The ingress PE terminates the pseudowire and forwards the packet to a CE router corresponding to the recipient.

SUMMARY

In a VPN environment, the Packet Switched Network between the VPN subnetworks often traverses multiple portions of the PSN, or core network. Each portion is operated by a particular service provider as an Autonomous System (AS), referred to as a segment of the network. Conventional pseudowires traverse individual segments of the core network. Pseudowires (PWs) are used to create an emulated circuit between a pair of "Provider Edge" (PE) routers on a Packet Switched Network (PSN). These circuits may carry Ethernet, frame relay, ATM, etc. AToM and L2TPv3 are two methods for creating Pseudowires. The PSN may be IP or MPLS (Multi-Protocol Label Switched). In such an enrvironment, a conventional individual pseudpwire traverses a segment between a pair of PE routers. Pseudowires, however, may be linked together by switching them at the PE routers defining the segments of the PSN. Such a pseudowire traversing multiple segments is referred to as a multi-hop pseudowire (MH-PW). The pseudowires included in such a multihop pseudowire may include various packet switching mechanisms operable with pseudowires, including but not limited to L2TPv3, MPLS and IP. Further, the MH-PW techniques discussed herein are applicable to PW implementations employing a Virtual Private Wire Service (VPWS) and a Virtual Private LAN Service (VPLS). VPLS builds on the VPWS point-to-point pseudowire framework exhibited by VPWS by adding packet replication and the ability to learn source-based MAC addresses for multipoint Layer 2 capabilities. The VPLS approach therefore allows interconnection of multiple point-to-point PWs together at a virtual bridge function to effectively form a VPN that has more than 2 end-points. Such an approach allows service providers to employ a Layer 2 architecture to offer multipoint Ethernet VPNs that connect multiple sites In a VPN environment employing pseudowires, VCCV (Virtual Circuit Connectivity Verification) is an often-employed protocol for checking the connectivity status of a given PW, operating in-band with the pseudowire data.

VCCV is used to "ping" a given PW, reporting data plane connectivity status for that PW. In a MH-PW environment, the ping may take the form of a LSP Ping, such as that disclosed in copending U.S. patent application Ser. No. 11/072,082, filed Mar. 4, 2005, entitled "SYSTEM AND METHODS FOR NETWORK REACHABILITY DETECTION". Such multihop pseudowires lend themselves particularly well to the LSP ping mechanism disclosed in the copending application cited above. However, conventional mechanisms for trying to perform VCCV across switched multihop PW segments encounter several shortcomings.

VCCV is designed to simply carry an LSP ping packet as an IP packet for the peer to receive and process. Responses are sent based on a lookup of the peer IP address. Since switched pseudowires may cross administrative boundaries with potentially overlapping address spaces border firewalls, such a mechanism may be inadequate. Further, VCCV has no procedure for passing through PW switching nodes or knowing when an end of a PW is reached (i.e. the ultimate PE node). Also, because the pseudowire mechanism abstracts the underlying physical routing hops, it may therefore present difficulties in determining the originating router when a VCCV request originates from the middle of a pseudowire (i.e. in an intermediate router).

Accordingly, configurations discussed herein are based, in part, on the observation that conventional pseudowires linking respective PEs tend to lose context information supporting protocols such as VCCV when the pseudowires are linked, or switched, together to form multihop pseudowires. Such context information, for example, may present difficulties for operations such as trace routing. Trace routing is a mechanism whereby path connectivity is verified by sending trace messages to successive routers along a particular path to receive return trace messages, similar to a so-called "ping" response. However, problems arise because pseudowires, by their nature, attempt to abstract the underlying individual router hops into a single labeled path encompassing multiple routers. Accordingly, it can be difficult to determine which intermediate router along a path initiated a trace route.

Therefore, configurations discussed herein substantially overcome the above described shortcomings with respect to multihop pseudowires by providing a mechanism for providing context information operable to span multiple segments in a multi-hop pseudowire. The mechanism provides the identity of the originating router in messages such as a traceroute message to enable responses to the traceroute to reach the originating router (originator) along a multihop pseudowire. Such a mechanism may take the form of an extension to the existing VCCV protocol which allows identification of an originating router (node) for a traceroute message sent via a multihop pseudowire.

Accordingly, configurations disclosed herein provide an accumulator operable to count hops along a MH-PW, implemented as a time-to-live (TTL) field, as is known in the art. An originator (i.e. PE router in a multihop pseudowire) sets multiple TTL values, initially to the same value, and decrements one of the TTL "accumulators" for each hop. The originator sends a control message, or traceroute request, to the terminal PE of the multihop pseudowire. At the ultimate (terminal) PE defining the end of the multihop PW, a TTL in the return message is set to the number of hops traveled by the traceroute. Since such a time-to-live (TTL) field is already decremented by the switching hardware (i.e. intermediate PE routers), the difference between the accumulator and the initial TTL value determines the number of hops traveled by the traceroute message, and hence the number of hops back to the originator.

The return message, now having a TTL set to the number of hops of the counterpart traceroute, reaches the originator when the TTL value is decremented to zero. In other words, the traceroute mechanism terminates the return message at a number of hops equal to the computed hops traveled by the transmitted trace message, the return message at that point having traveled back to the originating node.

In further detail, a provider edge (PE) router configured according to principles disclosed herein is operable to determining path availability (i.e. process traceback messages) by employing an accumulator operable to count intermediate hops. The PE router initially sets a maximum number of hops, such that the maximum number of hops and accumulator initially having a common value. The PE router transmits a message packet including the accumulator and the maximum number, such that the accumulator is operable to be decremented at each hop along a path to an ultimate node, in which the ultimate node is responsive to the transmitted message packet with a response message having a number of return hops computable from the accumulator and the maximum number, such that the return hops are operable to be decremented at each of the intermediate hops. The PE router then observes incoming message traffic for the response message by identifying the response message having a return hop decremented to zero.

In the exemplary arrangement, transmitting the message packet further includes sending a control message an incremental number of hops, and computing the difference between a traversed number of incremental hops and a maximum number of hops. The receiving router sets a maximum number of hops in a return message to the computed difference, and identifies when the set maximum number of hops is reached by the return message. The initiating PE router is therefore identified by decrementing the set maximum number of hops for each hop traversed by the return message, and concludes that the originating node has been reached when the maximum number of hops decrements to zero.

Traceroute information is gathered by, for each of the hops, appending time stamps, the time stamps operable to differentiate processing time and transmission time for a packet at the respective hops.

In the exemplary configuration, the originator PE transmits the control message packet over a pseudowire, such that the pseudowire is defined by a set of intermediate hops terminated by ultimate nodes, such that the message packet is adapted to commence at any of the intermediate hops. Sending the control message further includes sending the control message from at least one of the ultimate nodes and the intermediate hops, the accumulator and the maximum number operable to indicate the number of return hops back to the originating node.

In particular configurations, the control messages are operable to verify end-to-end connectivity by identifying the ultimate nodes between which connectivity verification is sought, and transmitting a control message to each of the ultimate nodes, i.e. sending a control message both ways on the pseudowire.

As the trace message (e.g. control message), and the trace response traverse the multihop pseudowire, the respective routers receive a trace message, in which the trace message has an initial hop value and an incremental hop value, the incremental hop value adapted to decrement each intermediate hop, and decrement the incremental hop value. The receiving router determines if the ultimate node has been reached, and if so, computes a return trace message having a maximum hop field of the number of hops traversed by the received trace message. If not, then the receiving router determines if the incremental hop has decremented to zero, and if so, concludes that the trace message is a trace response reaching the originating node. Otherwise, the receiving router forwards the trace message to the next router in the path for successive decrementing until the ultimate node is reached or the incremental hop value indicates trace completing at the originating node.

The receiving terminal (ultimate) router computes the difference between the accumulator and the maximum number of hops, such that the difference determines the number of hops the return message traverses to arrive at the originating node. Such hops are defined by the switching points, or switching routers, between the individual pseudowires that define the MH-PW. Forwarding the trace message further includes gathering identity information of each node traversed, and aggregating gathered identity information indicative of the path traveled by the trace message. Particular configurations also compute a maximum hop connectivity check by setting the incremental hop value to an allowable maximum number of hops to reach the ultimate node.

Alternate configurations of the invention include a multi-programming or multiprocessing computerized device such as a workstation, handheld or laptop computer or dedicated computing device or the like configured with software and/or circuitry (e.g., a processor as summarized above) to process any or all of the method operations disclosed herein as embodiments of the invention. Still other embodiments of the invention include software programs such as a Java Virtual Machine and/or an operating system that can operate alone or in conjunction with each other with a multiprocessing computerized device to perform the method embodiment steps and operations summarized above and disclosed in detail below. One such embodiment comprises a computer program product that has a computer-readable medium including computer program logic encoded thereon that, when performed in a multiprocessing computerized device having a coupling of a memory and a processor, programs the processor to perform the operations disclosed herein as embodiments of the invention to carry out data access requests. Such arrangements of the invention are typically provided as software, code and/or other data (e.g., data structures) arranged or encoded on a computer readable medium such as an optical medium (e.g., CD-ROM), floppy or hard disk or other medium such as firmware or microcode in one or more ROM or RAM or PROM chips, field programmable gate arrays (FPGAs) or as an Application Specific Integrated Circuit (ASIC). The software or firmware or other such configurations can be installed onto the computerized device (e.g., during operating system for execution environment installation) to cause the computerized device to perform the techniques explained herein as embodiments of the invention.

BRIEF DESCRIPTION OF THE DRAWINGS

The foregoing and other objects, features and advantages of the invention will be apparent from the following description of particular embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION

Figure 1:
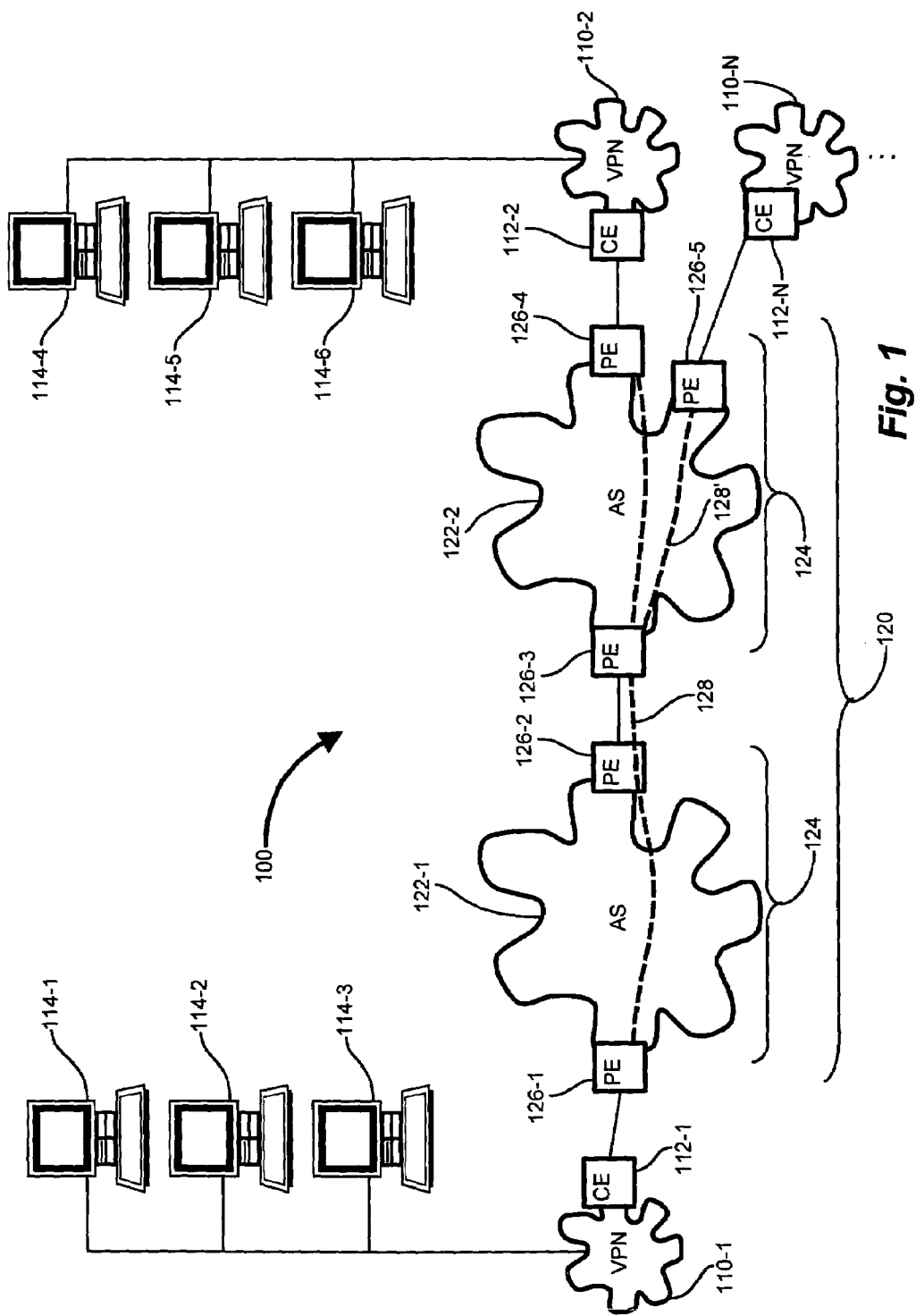
FIG. 1 is a context diagram of an exemplary managed information environment suitable for use with the present invention.

Configurations discussed herein provide a mechanism for maintaining context information operable to span multiple segments in a multi-hop pseudowire. The mechanism provides the identity of the originating router in messages such as a traceroute message to enable responses to the traceroute to reach the originating router (originator) along a multihop pseudowire. The exemplary arrangements discussed below provide an accumulator operable to count hops along a MH-PW, implemented as a time-to-live (TTL) field, as is known in the art. An originator (i.e. PE router in a multihop pseudowire) sets multiple TTL values, initially to the same value, and decrements one of the TTL "accumulators" for each hop. At the ultimate (terminal) PE defining the end of the multihop PW, a TTL in the return message is set to the number of hops traveled by the traceroute. Since such a time-to-live (TTL) field is already decremented by the switching hardware (i.e. intermediate PE routers), the difference between the accumulator and the initial TTL value determines the number of hops traveled by the traceroute message, and hence the number of hops back to the originating PE node, or originator.

The return message, now having a TTL set to the number of hops of the counterpart traceroute, reaches the originator when the TTL value is decremented to zero. The traceroute mechanism therefore terminates the return message at a number of hops equal to the computed hops traveled by the transmitted trace message packet, the return message at that point having traveled back to the originating node.

Such a mechanism may take the form of an extension to the existing VCCV protocol which allows identification of an originating router (node) for a traceroute message sent via a multihop pseudowire. The disclosed PW-Trace using VCCV is facilitated by sending a VCCV packet carrying a control message header having control word including the accumulator counts discussed above. The packet is switched through one or more multihop PEs (MH-PEs) without RP processing until reaching the end of a pre-specified number of hops as defined by a TTL in the PC-ACH header or the end of the PW, whichever comes first. A pw-trace response packet is then sent in the reverse direction for the same number of hops traversed by the received pw-trace VCCV packet.

In a particular exemplary configuration discussed herein, the mechanism for switching VCCV through an MH-PE, in an exemplary configuration, is as follows: define a new Fmt ID (0x01) in a Pseudo Wire Edge to Edge Emulation (PWE3) control word. This Fmt ID value will dictate that the following 8 bits are a Time To Live (TTL) field followed by two bytes for the "payload type." This control word is carried between the VCCV payload and MPLS label stack or L2TPv3 header. It is expected that switching hardware will be able to inspect and operate on this control word. The exemplary configuration discussed herein may be performed in conjunction with other established protocols or frameworks, or may be implemented in an independent or proprietary manner. For example, the approach discussed herein may be operable in conjunction with a protocol such as pseudo Wire Edge to Edge Emulation (PWE3), discussed in further detail in Internet RFC3916.

In the exemplary configurations discussed below, a multi-hop pseudowire includes a set of pseudowires aggregately switched to form the multihop pseudowire. In such a configuration, the multihop pseudowire (MH-PW) is defined by a pair of ultimate PEs. The ultimate PE is a provider edge device where the customer-facing ACs are bound to a PW forwarder. An ultimate PE is present in the first and last segments of a MH-PW, i.e. the terminal ends of the MH-PW. The MH-PW includes a set of single-Hop PW (SH-PW). A single hop PW is a PW set up between two PE devices using standard PWE3 signaling and encapsulation methods via a protocol or mechanism such as PWE3. The resulting multi-hop PW (MH-PW) is therefore a static or dynamically configured set of two or more contiguous PW segments (SH-PW) that behave and function as a single point-to-point PW. Each PW segment is setup and managed using standard PWE3 encapsulation and signaling methods. In such a MH-PW, a PW switching point (S-PE) defines a PE capable of switching the control and data planes of the preceding and succeeding PW segments (SH-PW) in a MH-PW. By this definition, a PW Switching Point is never the ultimate PE in a MH-PW. A PW switching point runs standard PWE3 protocols to setup and manage PW segments with other PW switching points and ultimate PEs. These entities are discussed in further detail in the discussion that follows.

FIG. 1 is a context diagram of an exemplary managed information environment suitable for use with the present invention. Referring to FIG. 1, the environment 100 includes VPN subnetworks 110-1 ... 110-2 (110 generally) connected via a packet switched network 120, or core network. Each of the VPNs 110-1,110-2 connects to the PSN 120 via a CE router 112-1, 112-2, respectively (112, generally) and serves a plurality of users 114-1 ... 114-6 (114, generally). The PSN 120 represents a public access network such as the Internet, and typically includes a plurality of portions including autonomous systems 122-1, 122-2 (122, generally), defining a segment 124. The autonomous systems 122 have PE routers 126-1 ... 126-4 (126, generally) at ingress and egress (i.e. edge) points of the AS 122. A multihop pseudowire 128 extends between PE routers 126-1-126-4 spanning the segments 124. Alternate configurations may have more segments 124, in which each segment 124 is defined by pseudowires between PE routers 126 of a particular autonomous system 122, switched together at the PE routers 126 to form the multihop pseudowire 128.

Further, multiple single hop pseudowires 128' may be interconnected at a virtual bridge, such as by VPWS and VPLS frameworks outlined above. Via such a bridge, additional PEs 126-5 connect additional endpoints of the multihop PW 128 at other VPNs 110-N via corresponding CEs 112-N.

Figure 2:
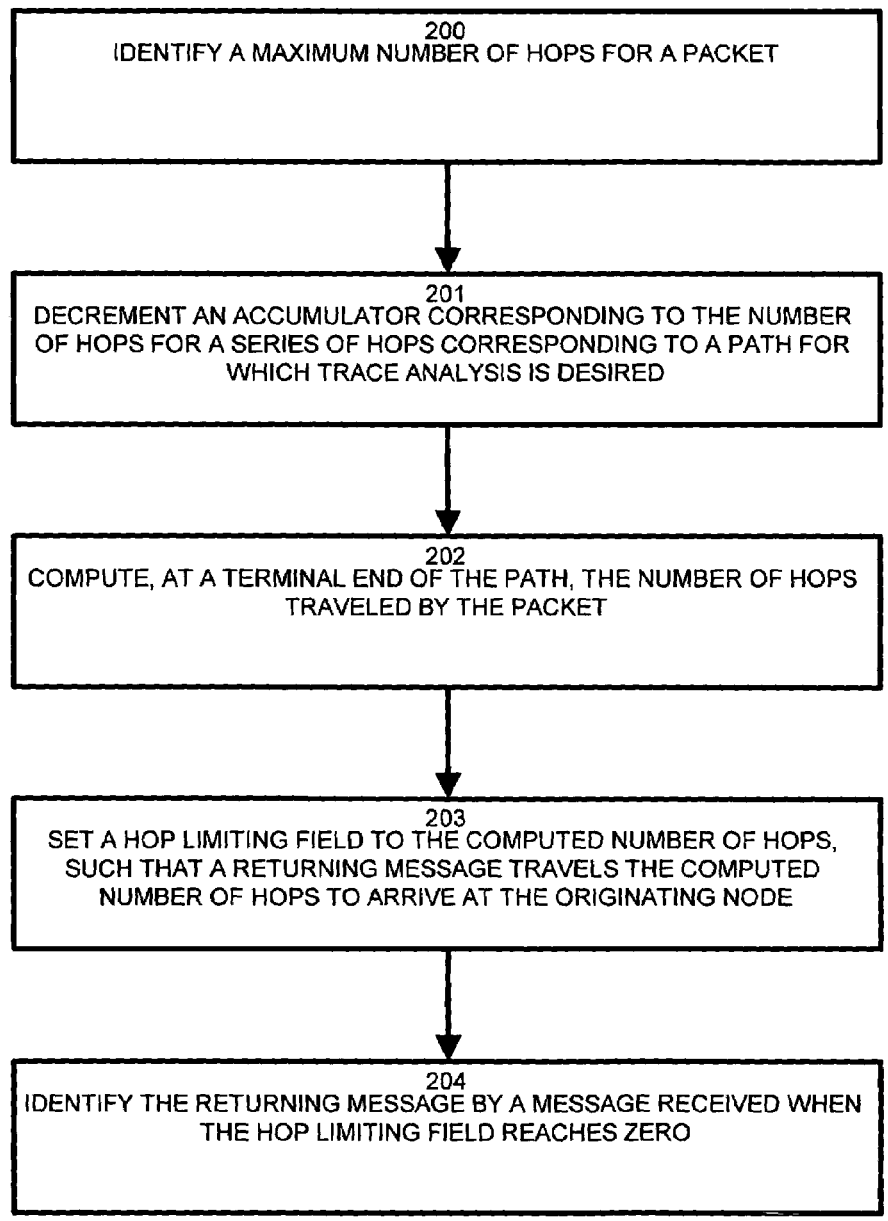
FIG. 2 is a flowchart of message routing in the system of FIG. 1 according to methods disclosed herein.

FIG. 2 is a flowchart of message routing in the system of FIG. 1 according to methods disclosed herein. Referring to FIGS. 1 and 2, the method of trace routing as disclosed herein includes, at step 200, identifying a maximum number of hops for a packet (e.g. message). The maximum number of hops is expressed in a so-called time-to-live (TTL) field common in network protocols to prevent rogue or misrouted packets from continuing indefinitely. Accordingly, the TTL field is operable to be auto-decremented by one for each hop traveled by the packet. Accordingly, at step 201, each intermediate (SW, or switching) router 126-2, 126-3 decrements an accumulator corresponding to the number of hops for a series of hops corresponding to the path, or pseudowire 128, for which trace analysis is desired. Therefore, the accumulator is indicative of the number of hops traveled by the packet. The ultimate router 126-4 then computes, at a terminal end of the path 128, the number of hops traveled by the packet, as depicted at step 202. As indicated above, the initial TTL setting is preserved in a separate message body field. The accumulator has been auto-decremented each hop. Accordingly, the difference between these two fields gives the number of hops traveled by the packet, and hence the number of return hops back to the originator. The ultimate router 126-4, therefore, sets a hop limiting field to the computed number of hops, such that a returning message travels the computed number of hops to arrive at the originating node 126-1, as shown at step 203. At step 204 upon arrival at the originator 126-1, the originator identifies the returning message by a message received when the hop limiting field reaches zero, e.g. when the TTL counts down to zero, as indicated in the following code fragment in TABLE I, employing a packet PAK in a control word CW with a time to live field TTL.

TABLE I

```
void process_cw (pak_type *pak)
{
    oam_cw_type cw = pak->cw;
    if (cw.first_byte == 0x10h) {
        /* backwards compatibility for single-hop VCCV */
        punt_for_vccv(pak);
    } else if (cw.first_byte == 0x11h) {
        /* A TTL follows */
        if ((--cw.ttl == 0) || (end_of_pw( ) == TRUE))
            /* If after decrementing TTL it is zero, */
            /* or we are the last PE in the PW chain, */
            /* punt the packet to VCCV for processing */
            punt_for_pw_switch_vccv (pak);
        else
            /* otherwise, switch to the next PW segment */
            pw_switch_pak (pak);
    } else {
        drop_pak (pak);
    }
    return;
}
```

Figure 3:
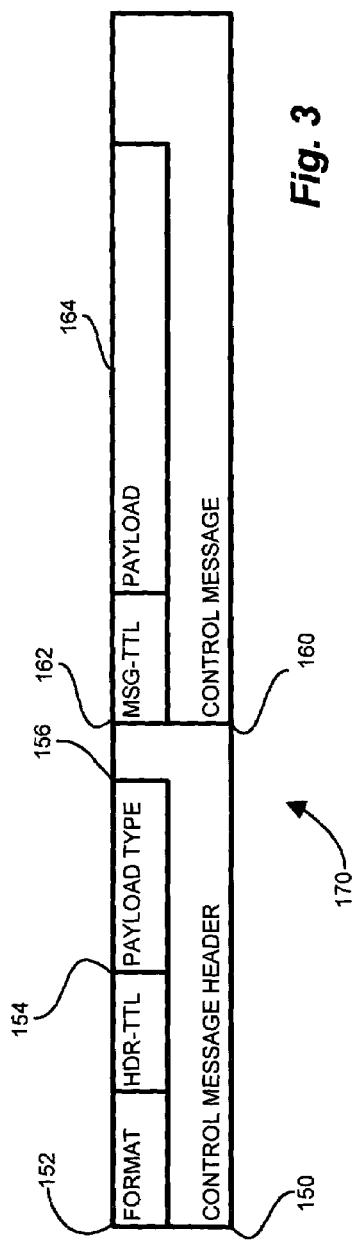
FIG. 3 is a diagram of message header fields for message packet routing according to FIG. 2.

FIG. 3 is a diagram of message header fields for message packet routing according to FIG. 2. In the exemplary packet shown in FIG. 3, a control word according to the methods disclosed herein is added to the message packet as a control message header 150. This may be, for example, an additional control word according to PWE3 or another suitable implementation. The control message header 150 includes a format field 152, identifying the control message header 150 and the TTL 154 and payload type fields 156 that follow. The HDR-TTL field 154 is set initially to a valid time-to-live value, typically 255. The payload type field 156 identifies the payload field 164 in the control message 160. The control message 160, in addition to the payload field 164, includes a MSG-TTL field 162 which is initially set the same as the HDR TTL field 156, however is not auto-decremented. The resulting difference of the HDR-TTL field 154, operating as an accumulator, and the static MSG-TTL 162 field gives the number of return hops back to the originator 126-1.

This approach may take the form of the additional control word (header) added to the VCCV packet as a control message header 150, or alternatively may take other suitable forms. In the exemplary arrangement, the originating TTL 154 is placed in the header 150 and in the VCCV control message 160 before sending the initial pw-trace VCCV packet. Thus, when processing the packet 170 we have two TTL values, (1) in the control word 154 that has been decremented along the path 128, and (2) in the control message itself 162. Therefore, we know how many hops we have come, and thus how far to go on the return path.

For the return pw-trace packet, the difference between the MSG-TTL 162 in the control message 160 and the HDR-TTL 154 in the control message header 150 is used as the new originating TTL. Therefore, the PW-trace return path 128 stops at the proper PE 126 in a chain of PWs—even if the PW-trace is initiated "mid-stream" at a PW-switching node. Further, if the originator is an MH-PE, the application will dictate which "direction" to send the VCCV pw-trace (presumably by pointing towards one next hop or the other in the pw-switch chain). Simultaneous tracing in both directions from a MH-PW node may also be performed.

Figure 4:
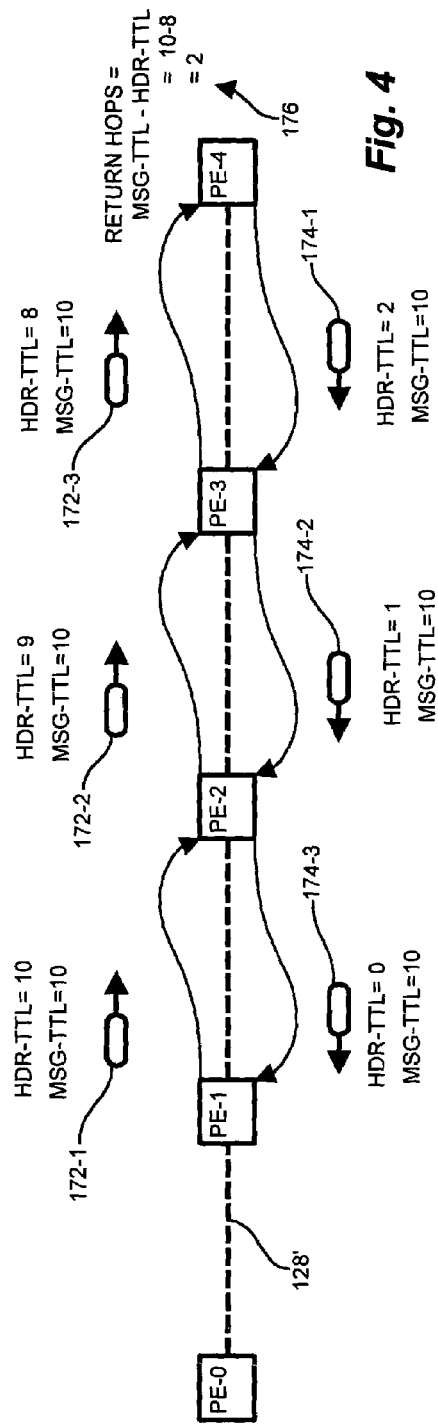
FIG. 4 is a block diagram of message packet values along a multihop pseudowire according to the flowchart of FIG. 2 and the packet structure of FIG. 3.

FIG. 4 is a block diagram of message packet values along a multihop pseudowire 128' according to FIG. 2 and the packet structure of FIG. 3. Referring to FIGS. 3 and 4, a routing sequence over a multihop pseudowire 128' is defined by router PE-0 . . . PE-4. PE-0 and PE-4 are the ultimate nodes and PE-1, PE-2 and PE-3 are the switching nodes between the single hop pseudowires. In this example, PE-1 is the originator and sends a trace message 172 to PE-4. The trace message 172 traverses three hops 172-1, 172-2 and 172-3, during which the HDR-TTL field 154 decrements from 10 to 8. Accordingly, the receiving ultimate node PE-4 computes the return hops as 2, shown as computation 176. A return message 174 includes the computed return hop value of 2 as the HDR-TTL field 154, since this field will be decremented toward zero at each hop. The static MSG-TTL field 162 retains the value of 10, having already been employed for computing the return hops. The HDR-TTL field 154 decrements at each of the hops 174-1, 174-2 and upon arrival at the originator PE-1 following hop 174-3, has a value of zero and is detected as the return trace message 174.

Figure 5:
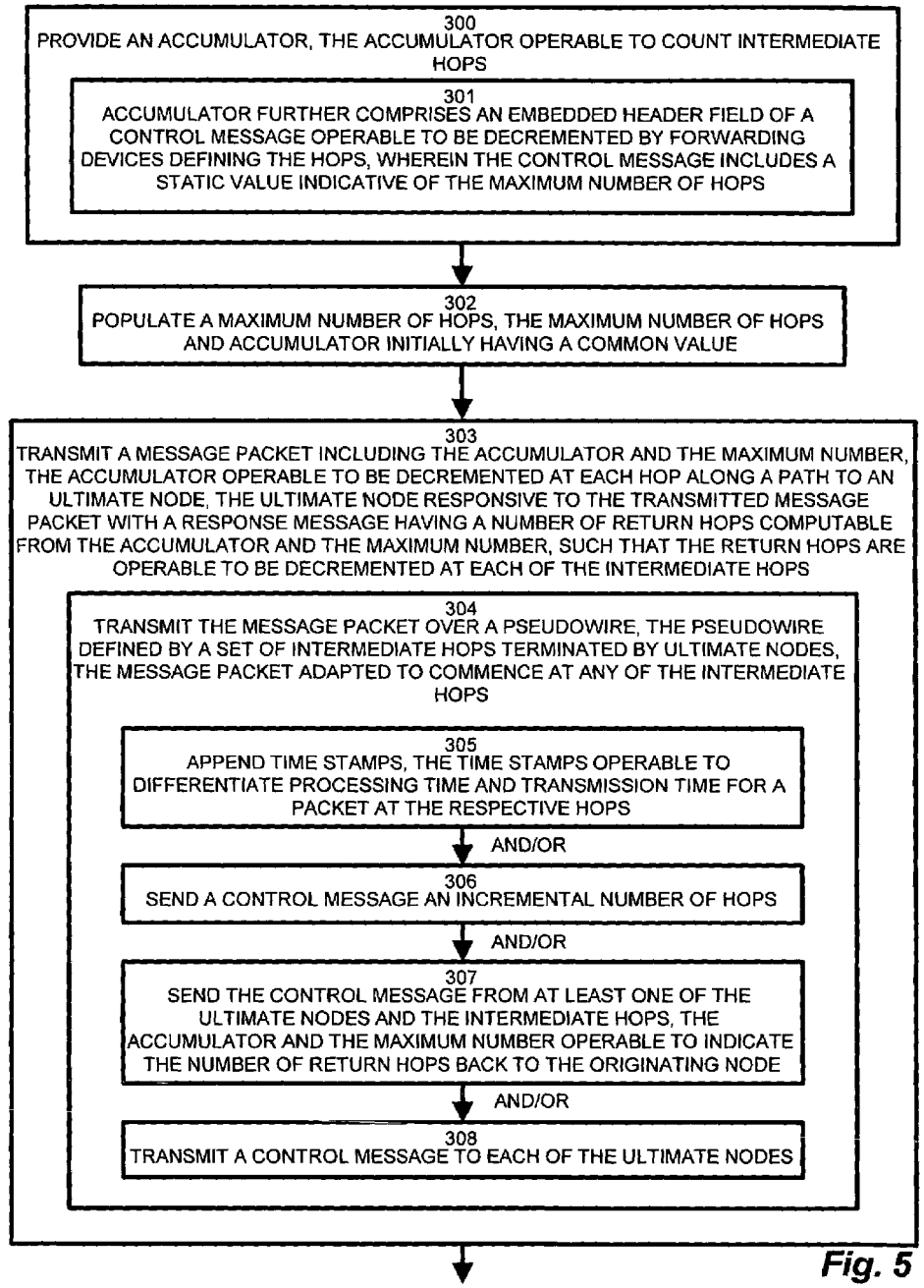
FIGS. 5-6 are a flowchart of message processing by an originator of a traceroute message in the system of FIG. 1.
Figure 6:
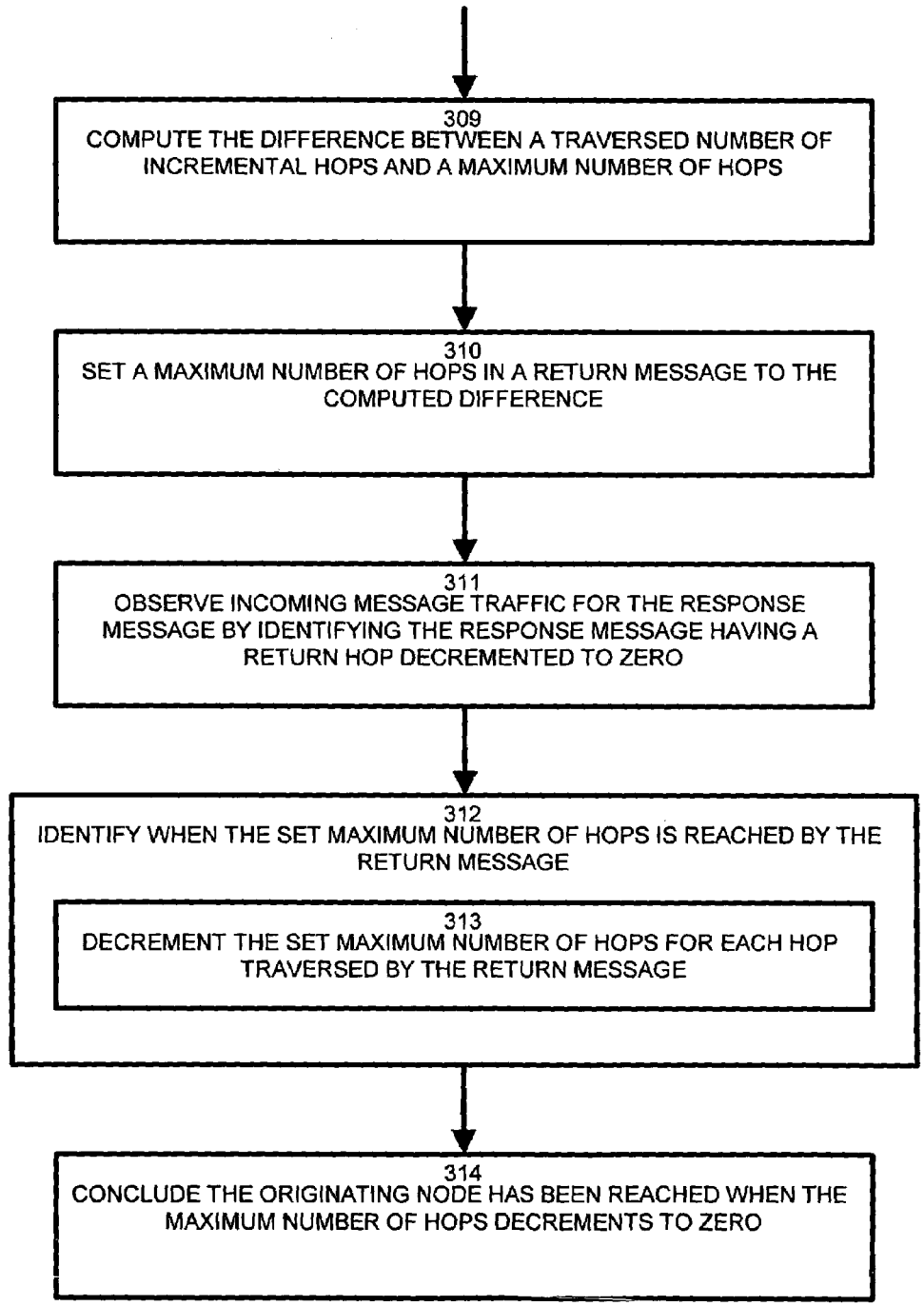

FIGS. 5 and 6 are a flowchart of message processing by an originator of a traceroute message in the system of FIG. 1. Referring to FIGS. 1, 3 and 5, the originator PE-2 of a trace message 170 as defined herein determines path availability along the pseudowire 128' via the trace message 170 by providing an accumulator, such that the accumulator is operable to count intermediate hops, as depicted at step 300. In the exemplary configuration, the accumulator is an embedded header field (e.g. HDR-TTL) 154 of the control message 170 operable to be decremented by forwarding devices PE-N defining the hops 172-N, wherein the control message 170 includes a static value (e.g. MSG-TTL) 162 indicative of the maximum number of hops, as shown at step 301. At step 302, the originator PE-1 also populates a maximum number of hops in the MSG-TTL 162 field such that the maximum number of hops field 162 and the accumulator 154 initially have a common value.

The originator PE-1 transmits the message packet 170 including the accumulator 154 and the maximum number field 162, such that the accumulator 154 is operable to be decremented at each hop 172-N along a path 128' (e.g. pseudowire) to an ultimate node PE-4. The corresponding ultimate node PE-4 is responsive to the transmitted message packet 170 with a response message 174 having a number of return hops, stored in the HDR-TTL 154 of the return message 174, computable from the accumulator 154 and the maximum number field 162, such that the return hops are operable to be decremented at each of the intermediate hops through a router PE-N, as depicted at step 303.

In the exemplary configuration, transmitting the message packet involves transmitting the message packet over a pseudowire 128', the pseudowire 128' defined by a set of intermediate hops PE-0 . . . PE-4 terminated by ultimate nodes PE-0, PE-4, the message packet 170 adapted to commence at any of the intermediate hops PE-N. Accordingly, the message packet 170 may employ any of the intermediate or ultimate nodes PE-0 . . . PE-5 as the originator node. The accumulator 154 and return hops fields (154), depending on the message direction, are employed to compute a TTL operable field that counts down to zero at the originator PE-1, as disclosed at step 304. Further, in particular configurations, the mechanism may, for each of the hops, append time stamps and other information such that the time stamps are operable to differentiate processing time and transmission time for a packet at the respective hops, as shown at step 305. Processing may further include, at step 306, sending a control message an incremental number of hops by setting the HDR-TTL 154 accordingly. For example, a particular scenario may require performance criteria of an ability to reach the ultimate node in no more than four hops. The corresponding trace sets the HDR-TTL 154 to four, and determines whether this is sufficient to reach the ultimate PE node. The various types of trace information such as time stamps and maximum hops are employed for performance criteria, such as QOS (Quality of Service) metrics and other customer service level agreements (SLAs) pertaining to contractual obligations for service minimums.

At step 307, sending the control message 170 may further include sending the control message from at least one of the ultimate nodes PE-0, PE04 and the intermediate hops PE-2, PE-3 and PE-4, the accumulator and the maximum number operable to indicate the number of return hops back to the originating node. Thus, the control message 170 is adapted to be sent from either the ultimate (terminal) PE router or from any PE in the multihop pseudowire. Alternatively, the control message 170 may be employed to verify end-to-end connectivity by identifying the ultimate nodes between which connectivity verification is sought (PE-0, PE-4), such as by transmitting a control message to each of the ultimate nodes, as depicted at step 308. Each of the ultimate nodes PE-0, PE-4 then responds with the return message, covering the full extent of the multihop pseudowire.

After the multihop pseudowire 128 transports the message to the ultimate PE-4, PE-4 computes the difference between a traversed number of incremental hops and a maximum number of hops, as depicted at step 309. The difference of the initial TTL value, stored as a static quantity in the MSG-TTL field 162 and the decremented TTL stored in the HDR-TTL 154 as an accumulator, provides the number of hops to reach the ultimate PE and hence the number of return hops back to the originator PE-1. According, the ultimate node PE-4 sets a maximum number of hops in a return message 170 to the computed difference, as depicted at step 310. The HDR-TTL field 154 is again used for the number of hops, because the HDR-TTL field 154 is decremented automatically by each hop, or segment, along the multihop pseudowire 128.

At the originator, the PE-1 node observes incoming message traffic for the response message 174 by identifying the response message having a return hop decremented to zero, as shown at step 311. As illustrated in the code fragment in TABLE I, conditional branching processes a message for which the TTL field has reached zero, as well as when the ultimate PE node is reached, shown by the punt_for_p-w_switch_vccc invocation. Accordingly, at step 312, the originator PE-1 identifies when the set maximum number of hops is reached by the return message 174. Such identification further includes the previous operation of decrementing the set maximum number of hops for each hop traversed by the return message 174, i.e. each of the successive PEs has decremented the HDR-TTL field 154, as disclosed at step 313. Accordingly, each of the PW nodes PE-N concludes that the originating node, PE-1 in this example, has been reached when the maximum number of hops 154 decrements to zero, as depicted at step 314.

Figure 7:
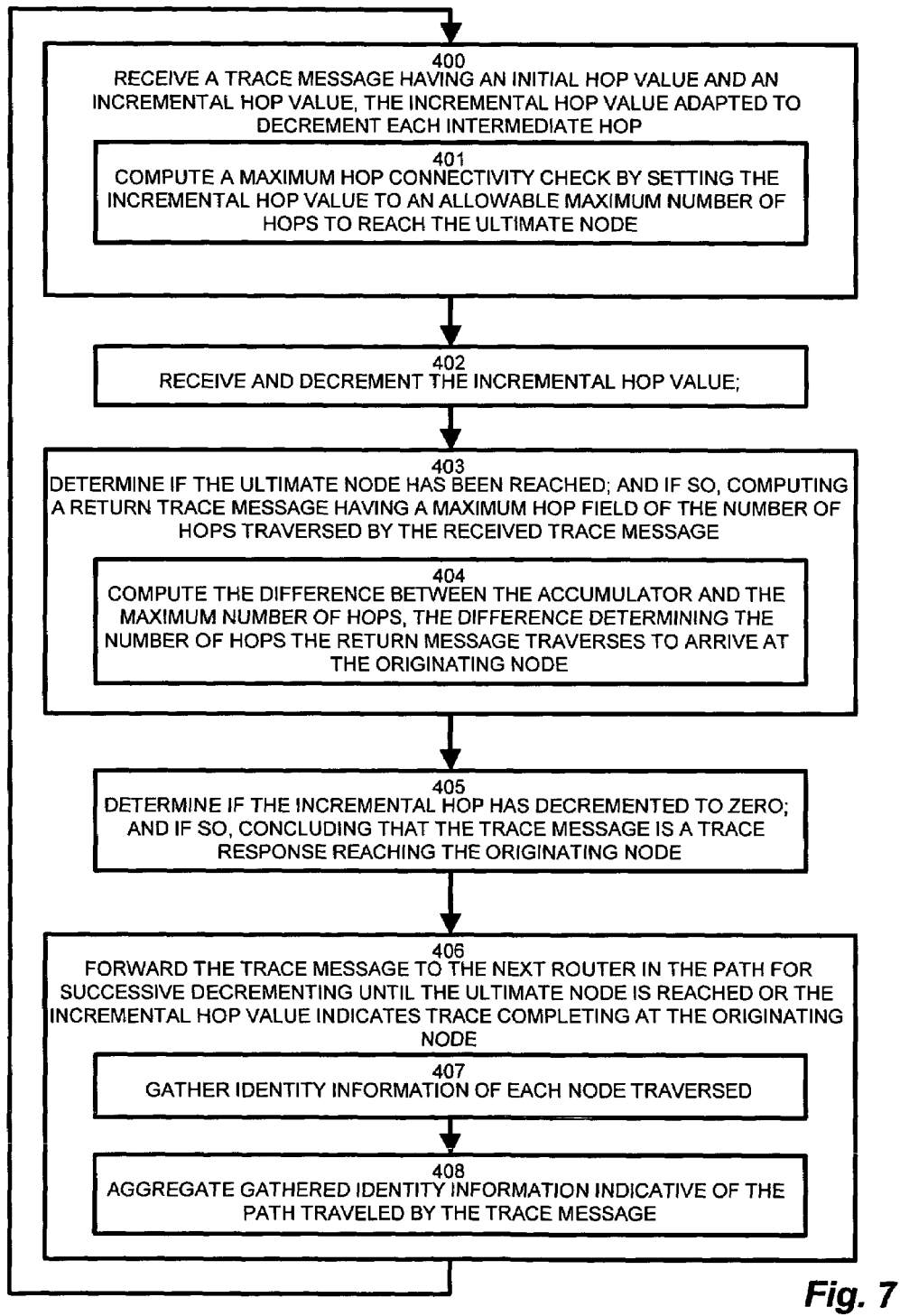
FIG. 7 is a flowchart of traceroute message processing by a switching node in a multihop pseudowire as in FIG. 3.

FIG. 7 is a flowchart of traceroute message processing by a switching node in a multihop pseudowire as in FIG. 3. Referring to FIGS. 3, 4 and 7, the traceroute processing employable by each of the ultimate and switching nodes PE-0 . . . PE-4 is disclosed. At step 400, the PE receives a trace message 170, in which the trace message 170 has an initial hop value, such as MSG-TTL 162 and an incremental hop value, such as HDR-TTL 154, such that the incremental hop value is adapted to decrement each intermediate hop. In particular arrangements, such as the hop limiting usage discussed in step 306, the PE may compute a maximum hop connectivity check by setting the incremental hop value to an allowable maximum number of hops to reach the ultimate node, as depicted at step 401.

At each successive hop, at step 402, the PE receives and decrements the incremental hop value 154. The receiving PE determines if the ultimate node has been reached, as shown at step 403, as and if so, computes a return trace message 174 having a maximum hop field of the number of hops traversed by the received trace message 172. Therefore, the receiving PE, at step 404, computes the difference between the accumulator (i.e. incremental hop value HDR=TTL) 154 and the maximum number of hops in the initial hop value stored in the MSG_TTL 162 the difference determining the number of hops the return message 174 traverses to arrive at the originating node PE-1. Further, the PE determines if the incremental hop has decremented to zero, as depicted at step 405, and if so, concludes that the received message is a trace response reaching the originating node PE-1, therefore indicating a return trace message 174-3 arriving for processing according to the connectivity and router identity information gathered.

Otherwise, if the current PE (hop) is not the ultimate PE PE-4 or the originator PE-1, then the PE forwards the trace message to the next router (PE) in the path for successive decrementing until the ultimate node (PE-4 in the example in FIG. 4) is reached or the incremental hop value indicates trace completing at the originating node PE-1 in the example, as disclosed at step 406. At step 407, forwarding the trace message further includes gathering identity information of each node traversed, such that the trace information may be returned in the return trace message 174. The forwarding router PE-N then aggregates the gathered identity information indicative of the path (MH-PW 128') traveled by the trace message 170, as depicted at step 408, for subsequent processing as a trace message.

Those skilled in the art should readily appreciate that the programs and methods for sending and processing trace messages as defined herein are deliverable to a processing device in many forms, including but not limited to a) information permanently stored on non-writeable storage media such as ROM devices, b) information alterably stored on writeable storage media such as floppy disks, magnetic tapes, CDs, RAM devices, and other magnetic and optical media, or c) information conveyed to a computer through communication media, for example using baseband signaling or broadband signaling techniques, as in an electronic network such as the Internet or telephone modem lines. The operations and methods may be implemented in a software executable object or as a set of instructions embedded in a carrier wave. Alternatively, the operations and methods disclosed herein may be embodied in whole or in part using hardware components, such as Application Specific Integrated Circuits (ASICs), Field Programmable Gate Arrays (FPGAs), state machines, controllers or other hardware components or devices, or a combination of hardware, software, and firmware components.

While the system and method for sending and processing trace messages has been particularly shown and described with references to embodiments thereof, it will be understood by those skilled in the art that various changes in form and details may be made therein without departing from the scope of the invention encompassed by the appended claims. Accordingly, the present invention is not intended to be limited except by the following claims.

What is claimed is:

1. A method of determining path availability comprising:
providing an accumulator, the accumulator counting intermediate hops;
populating a maximum number of hops, the maximum number of hops and accumulator initially having a common value;
transmitting a message packet over a pseudowire, the pseudowire defined by a set of intermediate hops terminated by ultimate nodes, the message packet adapted to commence at any of the intermediate hops, the message packet including the accumulator and the maximum number of hops, the accumulator decrementing at each hop along a path to an ultimate node so as to provide a traversed number of incremental hops, the ultimate node responsive to the transmitted message packet with a return message having a number of return hops computable from the accumulator and the maximum number, such that the number of return hops can be decremented at each of the intermediate hops, wherein transmitting the message packet further comprises:
sending the return message the number of return hops from at least one of the ultimate nodes and the intermediate hops, the accumulator and the maximum number of hops indicating the number of return hops back to the originating node;
computing a difference between the traversed number of incremental hops and the maximum number of hops;
setting the number of return hops in a return message to the computed difference;
identifying when the number of return hops is reached by the return message, which includes (i) decrementing the set number of return hops for each hop traversed by the return message and (ii) concluding the originating node has been reached when the number of return hops decrements to zero, wherein the step of identifying further comprises: for each of the hops, appending time stamps, the time stamps differentiate processing time and transmission time for a packet at the respective hops; and
observing incoming message traffic for the return message by identifying the return message having a return hop decremented to zero.

2. The method of claim 1 further comprising verifying end-to-end connectivity by:
identifying the ultimate nodes between which connectivity verification is sought; and
transmitting the control message to each of the ultimate nodes.

3. A method of tracing the path of a message comprising:
receiving a trace message, the trace message having an initial hop value and an incremental hop value the initial hop value and the incremental hop value initially having a common value and the incremental hop value having been decremented at each intermediate hop, each hop defining a pseudowire segment of a multi-hop pseudowire;

determining if the ultimate node has been reached; and if so, computing a return trace message having a maximum hop field of a number of hops traversed by the received trace message, where computing the return trace message includes computing a difference between the initial hop value and the incremental hop value and setting the number of hops traversed by the received trace message to the computed difference;

determining if the incremental hop has decremented to zero; and if so concluding that the return trace message has reached the originating node, where determining if the incremental hop has decremented to zero includes decrementing the incremental hop for each hop traversed by the return trace message and identifying whether the incremental hop has decremented to zero; and forwarding the trace message to the next router in the path for successive decrementing until the ultimate node is reached or the incremental hop value indicates trace completing at the originating node.

4. The method of claim 3 wherein the computed difference determines the number of hops the return message traverses to arrive at the originating node.

5. The method of claim 4 wherein forwarding the trace message further includes
gathering identity information of each node traversed; and
aggregating gathered identity information indicative of the path traveled by the trace message.

6. The method of claim 5 further comprising computing a maximum hop connectivity check by setting the incremental hop value to an allowable maximum number of hops to reach the ultimate node.

7. A method of trace routing for a multi-hop pseudowire comprising:
identifying a maximum number of hops for a packet;
decrementing an accumulator corresponding to the number of hops for a series of hops corresponding to a path for which trace analysis is desired;
computing, at a terminal end of the path, the number of hops traveled by the packet each hop defining a pseudowire segment of a multi-hop pseudowire;
setting a hop limiting field to the computed number of hops, such that a returning message travels the computed number of hops to arrive at the originating node; and
sending the returning message from the terminal end of the path toward the originating node, the accumulator and the maximum number operable to indicate the number of return hops back to the originating node.

8. The method of claim 7 wherein the accumulator further comprises an embedded header field of a control message operable to be decremented by forwarding devices defining the hops, wherein the control message includes a static value indicative of the maximum number of hops.

9. The method of claim 8 further comprising identifying the returning message by a message received when the hop limiting field reaches zero.

10. The method of claim 7 further comprising a plurality of terminal ends, each of the terminal ends forming a virtual bridge, each terminal ends operable to receive a replicated packet and generate a returning message corresponding to the received replicated packet.

11. An edge routing device for tracing the path of a message comprising:
a processor operable for processing instructions;
a memory operable to store instructions and responsive to the processor for executing the stored instructions;
an interface responsive to the processor coupled to a pseudowire, the interface operable to receive a trace message, the trace message having an initial hop value and an incremental hop value, the incremental hop value adapted to decrement each intermediate hop, each hop defining a pseudowire segment of a multi-hop pseudowire, the instructions further operable to:
decrement the incremental hop value;
determine if the ultimate node has been reached; and if so, compute a return trace message having a maximum hop field of a number of hops traversed by the received trace message, where computing the return trace message includes computing a difference between the initial hop value and the incremental hop value and setting the number of hops traversed by the received trace message to the computed difference;
determine if the incremental hop has decremented to zero; and if so, conclude that the trace message is a trace response reaching the originating node; and
forward the trace message to the next router in the path for successive decrementing until the ultimate node is reached or the incremental hop value indicates trace completing at the originating node.

12. The device of claim 11 wherein the computed difference determines the number of hops the return message traverses to arrive at the originating node.

13. The device of claim 12 wherein forwarding the trace message further includes
gathering identity information of each node traversed; and
aggregating gathered identity information indicative of the path traveled by the trace message.

14. The device of claim 13 wherein the instructions are further operable to compute a maximum hop connectivity check by setting the incremental hop value to an allowable maximum number of hops to reach the ultimate node.

15. A computer readable storage medium storing computer program logic embodied in computer program code encoded thereon that, when executed by a processor, perform a method for tracing a route over a multihop pseudowire comprising:
computer program code for maintaining an accumulator, the accumulator operable to count intermediate hops, each hop defining a pseudowire segment of a multi-hop pseudowire;
computer program code for populating a maximum number of hops, the maximum number of hops and accumulator initially having a common value;
computer program code for transmitting a message packet including the accumulator and the maximum number, the accumulator operable to be decremented at each hop along a path to an ultimate node, the ultimate node responsive to the transmitted message packet with a return message having a number of return hops computable from the accumulator and the maximum number, such that the return hops are operable to be decremented at each of the intermediate hops, further including:
computer program code for sending a control message an incremental number of hops, the accumulator and the maximum number indicating the number of return hops back to the originating node;
computer program code for computing the difference between a traversed number of incremental hops and a maximum number of hops;

computer program code for setting a maximum number of hops in the return message to the computed difference; and computer program code for identifying when the set maximum number of hops is reached by the return message, where the computer program code for identifying may (i) decrement the set maximum number of hops for each hop traversed by the return message and (ii) conclude the originating node has been reached when the maximum number of hops decrements to zero; and computer program code for observing incoming message traffic for the response message by identifying the response message having a return hop decremented to zero.

16. A method of determining network pseudowire path availability comprising:

providing an accumulator, the accumulator operable to count intermediate hops, each hop defining a pseudowire segment of a multihop pseudowire;

populating a maximum number of hops, the maximum number of hops and accumulator initially having a common value;

transmitting a message packet including the accumulator and the maximum number, the accumulator operable to be decremented at each hop along a path to an ultimate node, the message packet following a path defined by the pseudowire, the ultimate node responsive to the transmitted message packet with a response message having a number of return hops computable from the accumulator and the maximum number, such that the return hops are operable to be decremented at each of the intermediate hops; and observing incoming message traffic for the response message by identifying the response message having a return hop decremented to zero.

* * * * *

UNITED STATES PATENT AND TRADEMARK OFFICE
CERTIFICATE OF CORRECTION

PATENT NO. : 7,599,303 B2  Page 1 of 1
APPLICATION NO. : 11/189357
DATED : October 6, 2009
INVENTOR(S) : Nadeau et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 782 days.

Signed and Sealed this

Twenty-eighth Day of September, 2010

David J. Kappos
*Director of the United States Patent and Trademark Office*